United States Patent Office 3,312,590
Patented Apr. 4, 1967

3,312,590
TOPICALLY ACTIVE ANTI-INFLAMMATORY 17-MONO- AND 17,21-DIESTERS OF BETAMETHASONE AND ITS 9-CHLORO-ANALOGS, COMPOSITIONS AND USE THEREOF
Joseph Elks, London, Peter John May, North Harrow, and Niall Galbraith Weir, Wembley, England, assignors to Glaxo Laboratories Limited, Greenford, England, a British company
No Drawing. Filed June 9, 1964, Ser. No. 373,837
Claims priority, application Great Britain, June 11, 1963, 23,223/63; Jan. 28, 1964, 3,623/64
28 Claims. (Cl. 167—58)

This invention is concerned with new steroid compounds having high anti-inflammatory action on topical administration.

An important use of anti-inflammatory compounds is their use in topical preparations for the local treatment of inflammations and considerable research has been directed to find compounds having good local action on topical administration.

It is an object of the invention to provide new steroid compounds having particularly high anti-inflammatory action on topical application. It is a further object of the invention to provide compositions for topical application having high anti-inflammatory action.

We have found that certain new 17α-monoesters and 17α,21-diesters hereinafter described, in general provide considerably enhanced anti-inflammatory action following topical application as compared with other closely analogous compounds and/or the corresponding 17α,21-dihydroxy parent compounds. These new mono esters and diesters have in fact been found to possess anti-inflammatory action on topical application exceeding that of the best compounds hitherto especially proposed for topical purposes (as judged for example by the patch test of McKenzie et al., Arch. Derm., 1962, 86, 608).

It is an object of the present invention therefore to provide compounds represented by the formulae:

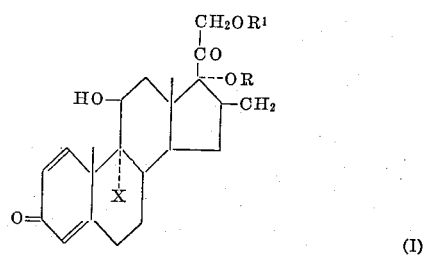

(I)

where X is halogen, especially fluorine, R is an alkanoyl group containing from 2 to 6 carbon atoms and $R^1$ is a grouping selected from the group consisting of hydrogen and alkanoyl groups containing from 1 to 7 carbon atoms the total number of carbon atoms in the groups R and $R^1$ being from 3 to 9.

It is a further object of the present invention to provide pharmaceutical compositions for use in the topical treatment of inflammation comprising compounds of Formula I where R, $R^1$ and X have the meanings stated above together with a topical vehicle for said steroid.

It is a further object of the invention to provide compounds of the formula:

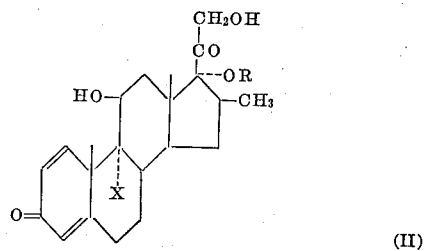

(II)

where X is halogen, especially fluorine and R is an alkanoyl group containing from 2 to 6 carbon atoms and pharmaceutical compositions for use in the topical treatment of inflammation comprising such compounds together with a topical vehicle for said steroid.

It is yet a further object of the present invention to provide compounds of the formula:

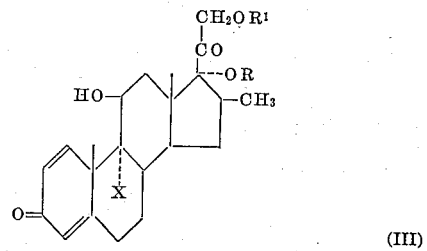

(III)

(where X is halogen, preferably fluorine, R is an alkanoyl group containing 2 to 6 carbon atoms and $R^1$ is an alkanoyl group containing 1 to 7 carbon atoms, the total number of carbon atoms in the groups R and $R^1$ together being from 3 to 9) and pharmaceutical compositions for use in the topical treatment of inflammation comprising such compounds together with a topical vehicle for said steroid.

The compounds according to this invention have high anti-inflammatory action on topical administration coupled with low mineralo-corticoid action, as well as low gluco-corticoid activity when administered systemically. The compounds thus have the desirable high anti-inflammatory action on topical administration, with little risk of disturbance of the mineral balance and other systemic action should the compound be absorbed.

The term "alkanoyl" is used herein in its broad sense to include straight and branched chained alkanoyl groups and cycloalkanoyl groups.

The group R in Formula II may for example be an acetyl, propionyl, butyryl, isobutyryl, valeryl or cyclopentanecarbonyl group and the group X is preferably fluorine. Compounds of Formula II are preferred in which the group R contains not more than 5 carbon atoms, a compound of particular interest being betamethasone 17-valerate, the anti-inflammatory activity of which (judged both by the patch test and by clinical trial) is quite outstanding.

In Formula III the group R may for example be an acetyl, propionyl, butyryl, isobutyryl or valeryl group. $R^1$ may for example be a formyl, acetyl, propionyl, butyryl, isobutyryl, valeryl or hexahydrobenzoyl group.

The active steroid may be formulated into a preparation suitable for topical administration in conventional manner with the aid of one or more carriers or excipients. Examples of types of preparation include ointments, lotions, creams, sprays, powders, drops (e.g. ear drops and eye drops), suppositories or retention enemas (e.g. for the treatment of rectal or colonic inflammations), and tablets or pellets (e.g. for the treatment of aphthous ulcers) and aerosols. Ointments and creams may for example, be formulated with an aqueous or oily base with the addition of suitable thickening and/or gelling agents. Such bases may thus, for example, include water and/or an oil such as liquid paraffin or a vegetable oil such as arachis oil or castor oil. Thickening agents which may be used according to the nature of the base include soft paraffin, aluminium stearate, cetostearyl alcohol, polyethylene glycols, woolfat, hydrogenated lanolin, beeswax etc.

Lotions may be formulated with an aqueous or oily base and will in general also include one or more of the following namely, stabilizing agents, emulsifying agents, dispersing agents, suspending agents, thickening agents, colouring agents, perfumes and the like.

Powders may be formed with the aid of any suitable powder base e.g. talc, lactose, starch etc. Drops may be formulated with an aqueous base or non-aqueous base also comprising one or more dispersing agents, suspending agents, solubilising agents etc.

The pharmaceutical compositions according to the invention may also include one or more preservatives or bacteriostatic agents e.g. methyl hydroxy benzoate, propyl hydroxy benzoate, chlorocresol, benzalkonium chlorides etc.

The compositions according to the invention may also contain other active ingredients such as antimicrobial agents, particularly antibiotics.

The proportion of active steroid in the compositions according to the invention depends on the precise type of formulaitons to be prepared but will generally be within the range of from 0.0001% to 5% by weight. Generally however for most types of preparations advantageously the proportion used will be within the range of from 0.001 to 0.5% and preferably 0.01 to 0.25%.

The new 17α-monoesters according to the invention may be prepared by any convenient method. Such methods in principle involve hydrolysis of a corresponding 17,21-orthoester or 17,21-diester. In one such method the corresponding 17,21-orthoester (the preparation of which is described in our copending application Ser. No. 567,309, filed July 19, 1966, a continuation of application Ser. No. 364,804, filed May 4, 1964, now abandoned) is subjected to hydrolysis, preferably under mild conditions to avoid any risk of the resulting 17α-monoester being rearranged to the isomeric 21-monoester. The above-mentioned orthoesters are compounds of the formula

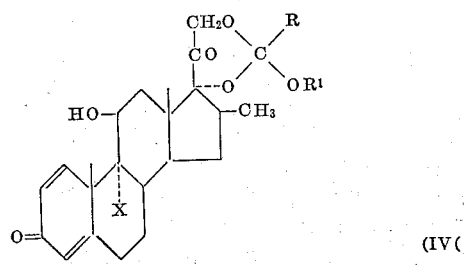

(IV)

in which R is an alkyl group containing 1–5 carbon atoms and R¹ is for example a methyl or ethyl group.

The hydrolysis of the orthoesters is preferably carried out in the presence of an acid catalyst e.g. a lower alkanoic acid e.g. acetic or propionic acid, or a strong mineral acid such as hydrochloric acid or sulphuric acid. The concentration of acid used varies according to its strength and the esters to be produced. In the case of weak acids the reaction media may consist essentially of the acid while for strong acids and easily hydrolysed compounds a trace of acid may be sufficient. The reaction may be carried out in the presence of water and a polar solvent medium, with or without heating according to the conditions necessary for any given compound. Solvents which may be used include esters e.g. ethyl acetate and ethers such as dioxan and tetrahydrofuran. Where weak acids e.g. acetic acid or propionic acid are used for the hydrolysis these may also serve as the solvent media. The presence of some water is necessary but this may only need to be present in trace quantities.

The reaction is readily followed by thin layer or paper chromatography of samples of the reaction mixture as the reaction proceeds.

The 17α-monoesters may also be prepared by the hydrolysis of 17α,21-diesters, this method of preparation being in general more suited to the production of esters having larger acyl radicals than smaller acyl radicals.

This reaction is preferably carried out under acidic conditions, e.g. using a strong acid e.g. hydrochloric acid or perchloric acid in a polar solvent e.g. a lower alkanol such as methanol or ethanol.

The 17,21-diesters used as starting material in the process may have alkanoyl, aroyl or aralkanoyl groups at the 21-position but preferably a lower alkanoyl group containing 2–5 carbon atoms. These diesters may be prepared by any convenient method e.g. by the methods described below with reference to the preparation of compounds of Formula II.

The new 17α,21-diesters according to the invention may be prepared by the acylation of the corresponding 17α, 21-diols or 17α-hydroxy-21-acyloxy compounds. This reaction is preferably effected by reaction of the steroid with the appropriate acid anhydride in the presence of a strong acid catalyst e.g. p-toluene sulphonic acid, perchloric acid or strongly acidic cation exchange resins. Furthermore the reaction may be carried out in the presence or absence of a solvent. Where a solvent is used it is preferably of a non-polar nature, examples of suitable solvents being carbon tetrachloride, benzene, toluene, methylene chloride and chloroform. Heating may or may not be necessary according to the reactivity of the reaction components.

Where a compound is desired in which R¹ and R are different acyl groups one may first prepare a 21-monoester and esterify this to introduce a different acyl group in the 17α-position.

17α,21-diesters may also be prepared by the acylation of corresponding 21-hydroxy 17α-monoesters as described above with reference to the preparation of compounds of Formula II. This esterification is preferably carried out with the appropriate acid anhydride or acid chloride under basic conditions, preferably in the presence of a tertiary organic base e.g. pyridine, quinoline, N-methyl piperidine, N-methylmorpholine or dimethylaniline. It is convenient to work using an excess of the tertiary organic base as solvent, but other solvents e.g. benzene, toluene, dioxan or tetrahydrofuran may also be used. The reaction is carried out with or without heating as may be necessary.

It will be appreciated that this method also is suitable for the production of diesters in which R¹ and R are different acyl groups.

For the better understanding of the invention the following examples are given only as illustration:

EXAMPLE 1

*17α-acetoxy-9α-fluoro-11β,21-dihydroxy-16β-methylpregna-1,4-diene-3,20-dione (betamethasone 17-acetate)*

9α - fluoro-11β-hydroxy-16β-methyl-17α,21-(1'-ethoxy-1'-methylmethylenedioxy)pregna-1,4-diene-3,20-dione (2 g.) was dissolved in acetic acid (22 ml.), and water (2 ml.) was added. After the solution had been kept for 30 minutes at room temperature water was added and the crystalline solid collected. Two crystallisations from acetone-petroleum ether afforded betamethasone 17-acetate (1.49 g.), M.P. 240–241° C. (decomp.), $[\alpha]_D$ +85.6° (c. 1.26, dioxan), $$\lambda_{max.}^{EtOH} 239 \text{ m}\mu \text{ } (\epsilon \text{ } 15,910)$$

(Found: C, 66.8; H, 7.2; F, 4.1. $C_{25}H_{33}FO_6$ requires C, H, 7.2%.)

EXAMPLE 2

*9α-fluoro - 11β,21 - dihydroxy-16β-methyl-17α-propionyloxypregna - 1,4 - diene-3,20-dione (betamethasone 17-propionate)*

A solution of 9α-fluoro-11β-hydroxy-16β-methyl-17α,21-(1'-ethyl - 1' - ethoxymethylenedioxy)pregna-1,4-diene-3,20-dione (538 mg.) in acetic acid (20 ml.), containing 2 drops of water, was allowed to stand at room temperature for 5 hr. Dilution of the mixture with water gave a white solid (457 mg.) which, after being filtered off and dried, was recrystallized from acetone to afford 9α - fluoro-11β,21-dihydroxy-16β-methyl-17α-propionyloxypregna-1,4-diene-3,20-dione (361 mg.) M.P. 230–235° C. $[\alpha]_D$ +82.0° (c., 1.0 dioxan), $$\lambda_{max.}^{EtOH} 238 \text{ m}\mu \text{ } (\epsilon \text{ } 15,400)$$

(Found: C, 66.8; H, 7.2; F, 4.1 $C_{25}H_{33}FO_6$ requires C, 66.9; H, 7.4; F, 4.2%.)

EXAMPLE 3

*17α-butyryloxy-9α-fluoro-11β,21-dihydroxy - 16β-methylpregna-1,4-diene - 3,20 - dione (betamethasone 17-butyrate)*

A solution of 9α-fluoro-11β-hydroxy-16β-methyl-17α,21-(1'-propyl-1'-methoxymethylenedioxy)pregna - 1,4-diene-3,20-dione (587 mg.) in acetic acid (5 ml.) containing water (0.2 ml.) was allowed to stand at room temperature for 2 hr. and then diluted with iced water. The white solid material (523 mg.) which was precipitated was removed by filtration, dried, and recrystallized from acetone-petroleum ether to give 17α-butyryloxy-9α-fluoro-11β,21-dihydroxy - 16β - methylpregna - 1,4-diene-3,20-dione (455 mg.) M.P. 195°. $[\alpha]_D$ +79° (c. 1.0, dioxan), $$\lambda_{max.}^{EtOH} 238\text{–}239 \text{ m}\mu \text{ } (\epsilon \text{ } 16,050)$$

(Found: C, 67.4; H, 7.5; F, 4.0. $C_{26}H_{35}FO_6$ requires C, 67.5; H, 7.6; F, 4.1%.)

EXAMPLE 4

*9α-fluoro-11β,21-dihydroxy - 16β - methyl - 17α - valeryloxypregna - 1,4 - diene-3,20-dione (betamethasone 17-valerate)*

(1) 9α-fluoro - 11β - hydroxy - 16β - methyl-17α,21-(1'-butyl-1'-methoxymethylenedioxy)pregna - 1,4 - diene-3,20-dione (1 g.) was dissolved in acetic acid (20 ml.) containing a few drops of water and the mixture was left overnight at room temperature. Dilution of the solution with water (100 ml.) afforded a solid which was removed by filtration. The aqueous filtrate was extracted with ether, the ether extract washed with dilute sodium carbonate solution and water, dried over magnesium sulphate and evaporated to give a crystalline solid which was combined with the solid removed earlier. Recrystallization from acetone-petroleum ether produced 9α-fluoro-11β,21-dihydroxy - 16β-methyl - 17α - valeryloxy-pregna-1,4-diene-3,20-dione (529 mg.) as needles M.P. 183–184°, $[\alpha]_D$ +77° (c., 1.0 dioxan)

$$\lambda_{max.}^{EtOH} 239 \text{ m}\mu \text{ } (\epsilon \text{ } 15,920)$$

(Found: C, 67.7; H, 7.8; F, 3.5. $C_{27}H_{37}FO_6$ requires C, 68.05; H, 7.8; F, 4.0%.)

(2) A suspension of 9α-fluoro-11β,17α,21-trihydroxy-16β-methylpregna-1,4-diene-3,20-dione (2 g.) in sodium dried benzene (500 ml.) was distilled vigorously for a few minutes, toluene-p-sulphonic acid mono-hydrate (30 mg.) and methyl orthovalerate (5 ml.) were added and distillation was continued for 10 mins. The mixture was then boiled under reflux for 1.5 hr. after which time unreacted betamethasone alcohol (400 mg.) was removed by filtration. The benzene solution was treated with solid sodium bicarbonate and a few drops of pyridine, filtered and evaporated to dryness at about 50° C. The residue, in ether, was filtered through grade III basic alumina (20 g.) to remove traces of unreacted betamethasone alcohol, the ether removed in vacuo and the residue of crude betamethasone 17,21-methyl orthovalerate was treated with acetic acid (20 ml.) and a few drops of water and left overnight at room temperature. The acetic acid solution was poured into water (100 ml.) and extracted with chloroform. The chloroform extracts were washed in turn with water, saturated sodium bicarbonate solution and water, dried and evaporated in vacuo. The residual gum was triturated with ether and a white crystalline solid (1.16 g.) isolated by filtration. Recrystallization from ether (containing a small amount of acetone)-petroleum ether gave 9α-fluoro-11β,21-dihydroxy-16β-methyl-17α-valeryloxypregna - 1,4 - diene-3,20-dione (871 mg.) as fine needles.

EXAMPLE 5

*9α-fluoro-11β,21 - dihydroxy - 17α - isobutyryloxy - 16β-methylpregna - 1,4 - diene-3,20-dione (betamethasone-17-isobutyrate)*

A solution of betamethasone (1 g.) in dioxan (40 ml.) was treated with toluene-p-sulphonic acid monohydrate (50 mg.) and methyl orthoisobutyrate (2.0 ml.) at room temperature for 10 minutes. The reaction mixture was poured into dilute sodium bicarbonate (400 ml.) and the precipitated betamethasone orthoisobutyrate isolated by filtration. This material was treated with acetic acid (20 ml.) containing a few drops of water at room temperature for 10 minutes and then poured into water (400 ml.). The precipitated material was filtered off, dissolved in ether, and dried over magnesium sulphate. The residue left after removal of the ether, was crystallised twice from a mixture of ether, containing a small amount of acetone, and petroleum to give betamethasone 17-isobutyrate (186 mg.) as rods, M.P. 248° dec.), $[\alpha]_D$ +79.7° (c. 1.0 dioxan), $$\lambda_{max.}^{EtOH} 237\text{–}239 \text{ m}\mu \text{ } (\epsilon \text{ } 15,950)$$

(Found: C, 67.75; H, 7.4. $C_{26}H_{35}FO_6$ requires C, 67.55; H, 7.65%.)

EXAMPLE 6

*9α-fluoro - 11β,21-dihydroxy - 17α - isovaleryloxy - 16β-methylpregna - 1,4 - diene-3,20-dione (betamethasone 17-isovalerate)*

Betamethasone (2 g.) was treated with methyl orthoisovalerate (4.0 ml.) and the intermediate betamethasone orthoisovalerate rearranged with aqueous acetic acid as described in Example 5 to afford betamethasone 17-isovalerate (361 mg.) as needles, M.P. 220°, $[\alpha]_D$ +76.0° (c. 0.93 dioxan), $$\lambda_{max.}^{EtOH} 238\text{–}239 \text{ m}\mu \text{ } (\epsilon \text{ } 15,680)$$

(Found C, 68.3; H, 8.2, $C_{27}H_{37}FO_6$ requires C, 68.05; H, 7.8%.)

EXAMPLE 7

*9α-fluoro - 17α - hexanoyloxy - 11β,21 - dihydroxy-16β-methylpregna - 1,4 - diene - 3,20-dione (betamethasone 17-hexanoate)*

Methyl orthohexanoate (0.6 ml.) was added to a solution of betamethasone (500 mg.) in dioxan (20 ml.) containing toluene-p-sulphonic acid (5 mg.). After 20 minutes at room temperature the mixture was poured into dilute sodium bicarbonate solution and the precipitated solid was filtered off and washed thoroughly with water. Recrystallisation from acetone-petroleum ether afforded betamethasone 17,21-methyl orthohexanoate (424 mg.), M.P. 147–149°, $[\alpha]_D$ +68.1° (c. 0.93 dioxan), $$\lambda_{max.}^{EtOH} \text{ 237–238 m}\mu \ (\epsilon \ 16,340)$$

(Found: C, 68.75; H, 8.45. $C_{29}H_{41}FO_6$ requires C, 69.05; H, 8.2%.)

The above orthoester (295 mg.) was dissolved in acetic acid (5 ml.) containing water (0.11 ml.) and the solution was kept at room temperature for 30 minutes. Dilution with water and recrystallisation of the precipitated solid from acetone-petroleum ether gave betamethasone 17-hexanoate (193 mg.), M.P. 166–169°, $[\alpha]_D$ +69.2° (c. 0.9 dioxan), $$\lambda_{max.}^{EtOH} \text{ 236–239 m}\mu \ (\epsilon \ 16,000)$$

(Found: C, 68.25; H, 7.95. $C_{28}H_{39}FO_6$ requires C, 68.55; H, 8.0%.)

EXAMPLE 8

17α-cyclopentanecarbonyloxy - 9α - fluoro - 11β,21-dihydroxy-16β-methylpregna - 1,4 - diene-3,20-dione (betamethasone 17-cyclopentanecarboxylate)

Betamethasone 17,21 - methyl orthocyclopentanecarboxylate (400 mg.) was dissolved in acetic acid (5 ml.) containing water (0.1 ml.) and the solution was left at room temperature for 25 minutes. Dilution with water and recrystallisation of the precipitated solid from acetone-petroleum ether afforded betamethasone 17-cyclopentanecarboxylate (233 mg.), M.P. 227.5–229.5°, $[\alpha]_D$ +72.3° (c. 0.95 in dioxan), $$\lambda_{max.}^{EtOH} \text{ 237–238 m}\mu \ (\epsilon \ 16,100)$$

(Found: C, 68.75; H, 7.7, $C_{28}H_{37}FO_6$ requires C, 68.85; H, 7.65%.)

EXAMPLE 9

9α - fluoro - 11β,21-dihydroxy-16β-methyl-17α-valeryloxypregna-1,4-diene-3,20-dione (betamethasone 17-valerate)

Betamethasone alcohol (12.1 g.) was suspended with stirring in ethyl acetate (242 ml.). Toluene-p-sulphonic acid monohydrate (0.66 g.) and methyl orthovalerate (11 ml.) were added. Complete solution occurred on slight warming. The solution was then treated with 2 N-aqueous sulphuric acid (2.5 ml.) at room temperature for 15 minutes before washing with saturated sodium bicarbonate solution (150 ml.) and water (150 ml.). The organic phase was dried over anhydrous magnesium sulphate, filtered and evaporated to dryness under reduced pressure.

The crude betamethasone 17-valerate was dissolved by stirring at reflux temperature in acetone (30 ml.); 80–100 petroleum ether (100 ml.) was slowly added before the mixture was allowed to cool to room temperature when the product was collected by filtration, washed by displacement with 10% acetone-petrol (25 ml.) and dried in vacuo at 40° C. to yield a white crystalline solid, 12.1 g. (81.5%), M.P. 180–182°, $[\alpha]_D$ +75.8° (c., 1.0 acetone).

EXAMPLE 10

9α - fluoro - 11β,21-dihydroxy-16β-methyl-17α-valeryloxypregna-1,4-diene-3,20-dione (betamethasone 17-valerate)

Betamethasone 17,21-orthovalerate prepared from betamethasone alcohol (200 g.) was dissolved in acetone (1.0 l.) and water (300 ml.) added, followed by 2 N-aqueous sulphuric acid (30 ml.) and stirred at room temperature for 15 minutes. Water (1.0 l.) was added and the mixture stirred until crystallisation occurred when more water (5.0 l.) was added. The mixture was stirred at room temperature for 20 minutes before the product was collected by filtration and washed with water.

The damp cake was dissolved in acetone (1.5 l.) and stirred with charcoal (10 g.) at room temperature for 1 hour. The charcoal was removed by filtration through a kieselguhr bed and washed with acetone (50 ml.). To the stirred filtrate was slowly added distilled water (5.0 l.). The mixture was stirred for 30 minutes before the product was collected by filtration, washed with distilled water (1.5 l.) and dried in vacuo at 40° to yield betamethasone 17-valerate as an off-white crystalline solid 222 g. (91.4%), M.P. 188–190°, $[\alpha]_D$ +78.6° (c., 1.0 acetone).

EXAMPLE 11

9α - fluoro - 11β,21-dihydroxy-16β-methyl-17α-valeryloxypregna-1,4-diene-3,20-dione (betamethasone 17-valerate)

9α - fluoro - 11β-hydroxy-16β-methyl-17α,21-divaleryloxypregna-1,4-diene-3,20-dione (514 mg.) was dissolved in methanol (30 ml.) and aqueous perchloric acid (72%; 2 ml.) was added. The solution was allowed to stand at room temperature for 5 hours and was then poured into cold water. The precipitated mixture (415 mg.) of 17-mono- and 17,21-di-ester was collected and chromatographed on alumina (12 g.). Elution with ethyl acetate-benzene (1:9 and 1:3) afforded, after crystallisation from ether, 9α - fluoro-11β,21-dihydroxy-16β-methyl-17α-valeryloxypregna-1,4-diene-3,20-dione (111 mg.), M.P. 177–178° C. (decomp.), $[\alpha]_D$ +76.4° (c. 1.1 dioxan).

EXAMPLE 12

9α - chloro - 11β,21-dihydroxy-16β-methyl-17α-propionyloxypregna-1,4-diene-3,20-dione 9α - chloro-11β-hydroxy-16β-methyl-17α,21-(1'-ethoxy-1' - ethylmethylenedioxy) - pregna-1,4-diene-3,20-dione (300 mg.) in acetone (35 ml.) was stirred and treated with water (1 ml.) and 2 N-sulphuric acid (0.1 ml.). After 50 minutes the solution was diluted with water and the precipitated solid was collected and recrystallised from acetone-petroleum ether to afford 9α-chloro-11β,21-dihydroxy - 16β-methyl-17α-propionyloxypregna-1,4-diene-3,20-dione, M.P. 196–198° C. (decomp.), $[\alpha]_D$ +107.5° (c. 0.78, chloroform), $$\lambda_{max.}^{EtOH} \text{ 237–239 m}\mu \ (\epsilon \ 15,500)$$

(Found: C, 64.2; H, 6.9; Cl, 7.7. $C_{25}H_{33}ClO_6$ requires C, 64.55; H, 7.15; Cl, 7.6%.)

EXAMPLE 13

21 - butyryloxy - 9α-fluoro-11β-hydroxy-17α-isobutyryloxy - 16β - methylpregna-1,4-diene-3,20-dione (betamethasone 17-isobutyrate 21-butyrate)

9α - fluoro - 11β,21-dihydroxy-17α-isobutyryloxy-16β-methylpregna-1,4-diene-3,20-dione (1.08 g.) in pyridine (10 ml.) was treated with butyric anhydride (2 ml.) at room temperature and the mixture set aside for 17 hours at 0° C. Dilution with water and extraction with ether gave the crude diester which was crystallised from ether-petroleum ether at −80° C. to afford 21-butyryloxy-9α-fluoro - 11β - hydroxy - 17α-isobutyryloxy-16β-methylpregna-1,4-diene-3,20-dione, M.P. 149–150° C. (decomp.), after previous softening $[\alpha]_D$ +65.0° (c. 1.0, dioxan), $$\lambda_{max.}^{EtOH} \text{ 237–240 m}\mu \ (\epsilon \ 15,550)$$

(Found: C, 67.7; H, 7.95. $C_{30}H_{41}FO_7$ requires C, 67.7; H, 7.8%.)

EXAMPLE 14

21 - acetoxy - 9α-fluoro-11β-hydroxy-16β-methyl-17α-valeryloxypregna - 1,4 - diene-3,20-dione (betamethasone 17-valerate 21-acetate)

Betamethasone 17-valerate (300 mg.) was dissolved in pyridine (3 ml.) and treated with acetic anhydride (0.08 ml.) and kept at 0° C. overnight. The mixture was treated with water (50 ml.), extracted with chloroform and the extracts washed with N-hydrochloric acid and water, dried and evaporated. Crystallisation of the residue from ethyl acetate-petroleum gave betamethasone 17- valerate 21-acetate (132 mg.) as fine needles, M.P. 202° C. (cap.), [α]$_D$ +50.5° (c. 1.1 dioxan), $$\lambda_{max.}^{EtOH} \ 238 \ m\mu \ (\epsilon \ 15,510)$$

(Found: C, 66.95; H, 7.65. $C_{29}H_{39}FO_7$ requires C, 67.15; H, 7.6%.)

EXAMPLE 15

*17α,21 - diacetoxy - 9α-fluoro-11β-hydroxy-16β-methylpregna - 1,4-diene-3,20-dione (betamethasone 17,21-diacetate)*

Betamethasone 17-acetate (1.2 g.) in ice cold dry pyridine (15 ml.) was treated with acetic anhydride (6 ml.) at room temperature for 1½ hours. The mixture was poured into ice water (ca. 1 litre) and the solid material isolated by filtration, dissolved in chloroform and dried over magnesium sulphate. The residue left after evaporation of the chloroform was crystallised from acetone-petroleum to give betamethasone 17,21-diacetate (830 mg.) as prisms, M.P. ca. 130° (dec.), [α]$_D$ +66° (c., 1.4 dioxan), $$\lambda_{max.}^{EtOH} \ 239 \ m\mu \ (\epsilon \ 14,870)$$

(Found: C, 65.65; H, 7.35. $C_{26}H_{33}FO_7$ requires C, 65.5; H, 7.0%.)

EXAMPLE 16

*17α - acetoxy - 9α-fluoro-11β-hydroxy-16β-methyl-21-valeryloxypregna - 1,4 - diene-3,20-dione (betamethasone 17-acetate 21-valerate)*

Betamethasone 17-acetate (500 mg.) in pyridine (10 ml.) was treated with valeryl chloride (0.1 ml.) at room temperature for 40 minutes. The mixture was diluted with water and extracted with ether. The extracts were washed with water, dried, and evaporated in vacuo. Recrystallisation of the residue from ether-acetone-petroleum gave betamethasone 17-acetate 21-valerate (300 mg.), M.P. 124–125° C. decomp., [α]$_D$ +64° (c. 1.09 dioxan), $$\lambda_{max.}^{EtOH} \ 238 \ m\mu \ (\epsilon \ 16,230)$$

(Found: C, 67.5; H, 8.1. $C_{29}H_{39}FO_7$ requires C, 67.2; H, 7.6%.)

EXAMPLE 17

*17α - acetoxy-9α - fluoro-21-hexahydrobenzoyloxy-11β-hydroxy - 16β - methylpregna - 1,4 - diene - 3,20-dione (betamethasone 17-acetate 21-hexahydrobenzoate)*

Betamethasone 17-acetate (500 mg.) was treated with hexahydrobenzoyl chloride (0.1 ml.) and the product isolated as in Example 16. Crystallisation of the crude product from ether-acetone-petroleum afforded betamethasone 17-acetate 21-hexahydrobenzoate (408 mg.), M.P. 228–229° C. (decomp.), [α]$_D$ +75.7° (c. 1.95 dioxan), $$\lambda_{max.}^{EtOH} \ 238-239 \ m\mu \ (\epsilon \ 16,390)$$

(Found: C, 68.6; H, 7.6, $C_{31}H_{41}FO_7$ requires C, 68.4; H, 7.6%.)

EXAMPLE 18

*17α-acetoxy-9α-fluoro-11β-hydroxy-21-isobutyryloxy-16β-methylpregna-1,4-diene-3,20-dione (betamethasone 17-acetate 21-isobutyrate)*

Betamethasone 17-acetate (500 mg.) was treated with isobutyryl chloride (0.1 ml.) and the product isolated as in Example 16. Recrystallisation of the crude product from ether-acetone-petroleum gave betamethasone 17-acetate 21-isobutyrate (366 mg.), M.P. 211–212° (decomp.), [α]$_D$ +70° (c. 1.7 dioxan), $$\lambda_{max.}^{EtOH} \ 238 \ m\mu \ (\epsilon \ 16,290)$$

(Found: C, 66.5; H, 7.35, $C_{28}H_{37}FO_7$ requires C, 66.65; H, 7.4%.)

EXAMPLE 19

*9α - fluoro - 11β - hydroxy - 17α,21-di-isobutyryloxy-16β-methylpregna-1,4-diene - 3,20 - dione (betamethasone 17,21-diisobutyrate)*

Betamethasone 17-isobutyrate (500 mg.) was treated with isobutyryl chloride (0.135 ml.) and the product isolated as in Example 16. Filtration of the crude product through magnesium silicate (30 g.) in benezene-chloroform (9:1) and crystallisation from benzene-petroleum yielded betamethasone 17,21-di-isobutyrate (414 mg.), M.P. 121–124°, [α]$_D$ +67.2° (c. 0.9 dioxan), $$\lambda_{max.}^{EtOH} \ 238-239 \ m\mu \ (\epsilon \ 15,650)$$

(Found: C, 67.5; H, 7.65; $C_{30}H_{41}FO_7$ requires C, 67.65; H, 7.8%.)

EXAMPLE 20

*9α - fluoro - 11β-hydroxy-16β-methyl-17α,21-dipropionyloxy-pregna-1,4-diene - 3,20 - dione (betamethasone 17, 21-dipropionate)*

Bethmethasone 17-propionate (812 mg.) in pyridine (10 ml.) was treated with propionyl chloride (0.21 ml.) at 0° C. for 1 hour. Dilution with water and acidification with dilute hydrochloric acid gave the crude diester. Recrystallisation from acetone-petroleum ether afforded betamethasone 17,21-dipropionate (649 mg.), M.P. 117° C. (decomp.), [α]$_D$ +62.2° (c. 0.96 dioxan), $$\lambda_{max.}^{EtOH} \ 238-239 \ m\mu \ (\epsilon \ 15,100)$$

(Found: C, 66.4; H, 7.4. $C_{28}H_{37}FO_7$ requires C, 66.65; H, 7.4%.)

EXAMPLE 21

*21 - acetoxy - 9α - fluoro - 11β-hydroxy-16β-methyl-17α-propionyloxypregna - 1,4 - diene - 3,20 - dione (betamethasone 17-propionate 21-acetate)*

Betamethasone 17-propionate (902 mg.) in pyridine (10 ml.) was treated with acetic anhydride (0.25 ml.) as in Example 20 for 18 hours. Crystallization of the crude product from ether afforded betamethasone 17-propionate 21-acetate (474 mg.), M.P. 134° C. (decomp.), [α]$_D$ +64.1° (c. 0.92 dioxan), $$\lambda_{max.}^{EtOH} \ 238 \ m\mu \ (\epsilon \ 15,750)$$

(Found C, 66.1; H, 7.3. $C_{27}H_{35}FO_7$ requires C. 66.1; H, 7.2%.)

EXAMPLE 22

*17α - acetoxy - 9α-fluoro-21-formyloxy-11β-hydroxy-16β-methylpregna-1,4-diene - 3,20 - dione (betamethasone 17-acetate 21-formate)*

17α - acetoxy-9α-fluoro-11β,21-dihydroxy-16β-methyl-pregna-1,4-diene-3,20-dione (500 mg.) in formic acid (98–100%; 2 ml.) containing p-toluene-sulphonic acid (50 mg.) was allowed to stand at room temperature. After five hours the solution was poured into iced water (100 ml), the precipitated solid was removed by filtration, washed with dilute sodium bicarbonate solution and water, dried and recrystallised from ether-petroleum ether to afford betamethasone 17-acetate 21-formate (333 mg.), M.P. 225° C., [α]$_D$ +62.5° (c. 1.0, dioxan), $$\lambda_{max.}^{EtOH} \ 237-240 \ m\mu \ (\epsilon \ 14,750)$$

(Found: C, 64.9; H, 6.8. $C_{25}H_{31}FO_7$ requires C, 64.9; H, 6.8%.)

EXAMPLE 23

*17α - acetoxy - 9α - fluoro-11β-hydroxy-16β-methyl-21-propionyloxypregna-1,4-diene-3,20-dione (betamethasone 17-acetate 21-propionate)*

17α - acetoxy-9α-fluoro-11β,21-dihydroxy-16β-methyl-pregna-1,4-diene-3,20-dione (500 mg.) was dissolved in dry pyridine (10 ml.) at 0°C. and treated with propionyl chloride (0.15 ml.). After 1 hour the mixture was diluted with iced water and the precipitated solid was removed by filtration, dissolved in ether and the solution filtered through alumina (20 g). Crystallisation of the eluted material from ether-acetone-petroleum ether and then ether-petroleum ether gave betamethasone 17-acetate 21-propionate (160 mg.), M.P. 122°C. (decomp.), $[\alpha]_D$ +65.5° (c. 1.0, dioxan), $$\lambda_{max.}^{EtOH}\ 236–240\ m\mu\ (\epsilon\ 14,600)$$

(Found: C, 66.4; H, 7.65. $C_{27}H_{35}FO_7$ requires C. 66.1; H, 7.2%.)

EXAMPLE 24

21 - butyryloxy - 9α-fluoro-11β-hydroxy-16β-methyl-17α-propionyloxypregna-1,4-diene-3,20-dione (betamethasone 17-propionate 21-butyrate)

9α-fluoro-11β,21-dihydroxy-16β-methyl-17α-propionyloxypregna-1,4-diene-3,20-dione (517 mg.) in dry pyridine (10 ml.) was cooled to 0° C. and treated with butyric anhydride (0.24 ml.). After 2 days the solution was diluted with water, acidified with dilute hydrochloric acid and the white crystalline material was removed by filtration. Recrystallisation from ether gave betamethasone 17-propionate 21-butyrate (439 mg.), M.P. 161–163° C. (decomp), $[\alpha]_D$ +67.5° (c. 0.95, dioxan), $$\lambda_{max.}^{EtOH}\ 238–239\ m\mu\ (\epsilon\ 15,900)$$

(Found: C, 67.45; H. 7.9. $C_{29}H_{39}FO_7$ requires C, 67.2; H, 7.6%.)

EXAMPLE 25

9α-fluoro-11β-hydroxy-21-isobutyryloxy-16β-methyl-17α-propionyloxypregna-1,4-diene-3,20-dione (betamethasone 17-propionate 21-isobutyrate)

9α-fluoro-11β,21-dihydroxy-16β-methyl-17α-propionyloxypregna-1,4-diene-3,20-dione (364 mg.) in dry pyridine (5 ml.) was treated with isobutyryl chloride (0.12 ml.) for 1 hour at 0° C. and worked up as described in Example 24. Crystallisation from ether gave betamethasone 17-propionate 21-isobutyrate (216 mg.), M.P. 153° C. (decomp.), $[\alpha]_D$ +66.0° (c. 1.0, dioxan), $$\lambda_{max.}^{EtOH}\ 236–239\ m\mu\ (\epsilon\ 15,750)$$

(Found: C, 67.3; H, 7.8. $C_{29}H_{39}FO_7$ requires C, 67.2; H, 7.6%.)

EXAMPLE 26

9α - fluoro-11β-hydroxy-16β-methyl-17α-propionyloxy-21-valeryloxypregna - 1,4-diene-3,20-dione (betamethasone 17-propionate 21-valerate)

9α - fluoro-11β,21-dihydroxy-16β-methyl-17α-propionyloxypregna-1,4-diene-3,20-dione (328 mg.) in pyridine (5 ml.) was treated with valeryl chloride (0.12 ml.) for 1 hour at 0° C. and worked up as described in Example 24. The crude product was filtered through magnesium silicate (10 g.) in ethyl acetate-benzene (1:9) and the eluted material recrystallised twice from ether-petroleum ether to afford betamethasone 17-propionate 21-valerate, M.P. 112–113° C. (decomp.), $$\lambda_{max.}^{EtOH}\ 238–240\ m\mu\ (\mu\ 16,400)$$

(Found: C, 67.7; H, 7.9. $C_{30}H_{41}FO_7$ requires C, 67.7; H, 7.8%.)

EXAMPLE 27

9α - fluoro - 11β - hydroxy-16β-methyl-21-pivalyloxy-17α-propionyloxypregna - 1,4-diene-3,20-dione (betamethasone 17-propionate 21-pivalate)

9α - fluoro-11β,21-dihydroxy-16β-methyl-17α-propionyloxypregna-1,4-diene-3,20-dione (990 mg.) in dry pyridine (10 ml.) was treated with pivalyl chloride (0.35 ml.) for 1 hour at 0° C. and worked up as described in Example 24. Recrystallisation of the crude product from benzene gave betamethasone 17-propionate 21-pivalate (800 mg.), M.P. 214–215° C. (decomp.) $[\alpha]_D$ +64.1° (c. 0.91, dioxan), $$\lambda_{max.}^{EtOH}\ 239\ m\mu\ (\epsilon\ 15,250)$$

(Found: C, 67.5; H, 7.55. $C_{30}H_{41}FO_7$ requires C, 67.7; H, 7.8%.)

EXAMPLE 28

21 - acetoxy - 17α-butyryloxy-9α-fluoro-11β-hydroxy-16β-methylpregna-1,4-diene-3,20-dione (betamethasone 17-butyrate 21-acetate)

17α-butyryloxy-9α-fluoro-11β,21-dihydroxy-16β-methylpregna-1,4-diene-3,20-dione (700 mg.) in dry pyridine (10 ml.) was treated with acetyl chloride (0.14 ml.) for 1 hour at 0° C. and worked up as described in Example 24. Crystallisation of the crude product from ether-petroleum ether gave betamethasone 17-butyrate 21-acetate (420 mg.), M.P. 168° C., $[\alpha]_D$ +71° (c. 1.1, dioxan), $$\lambda_{max.}^{EtOH}\ 237–239\ m\mu\ (\epsilon\ 15,250)$$

(Found: C, 66.8; H, 7.4. $C_{28}H_{37}FO_7$ requires C, 66.65; H, 7.4%.)

EXAMPLE 29

17α - butyryloxy - 9α - fluoro-11β-hydroxy-16β-methyl-21-propionyloxypregna - 1,4-diene-3,20-dione (betamethasone 17-butyrate 21-propionate)

17α-butyryloxy-9α-fluoro-11β,21-dihydroxy-16β-methylpregna-1,4-diene-3,20-dione (700 mg.) in dry pyridine (10 ml.) was treated with propionyl chloride (0.17 ml.) at 0° C. for 1.5 hours and worked up as described in Example 24. The crude product was dissolved in benzene and the solution filtered through alumina (25 g.). The eluted material was recrystallised from ether-petroleum ether to give betamethasone 17-butyrate 21-propionate, M.P. 145° C., $[\alpha]_D$ +68.5° (c. 0.98, dioxan), $$\lambda_{max.}^{EtOH}\ 238\ m\mu\ (\epsilon\ 15,700)$$

(Found: C, 67.2; H, 7.5. $C_{29}H_{39}FO_7$ requires C, 67.1; H, 7.6%.)

EXAMPLE 30

17α,21 - dibutyryloxy - 9α - fluoro-11β-hydroxy-16β-methylpregna - 1,4 - diene-3,20-dione (betamethasone 17,21-dibutyrate)

17α-butyryloxy-9α-fluoro-11β,21-dihydroxy-16β-methylpregna-1,4-diene-3,20-dione (700 mg.) in dry pyridine (10 ml.) was treated with butyric anhydride (0.32 ml.) and the solution kept for 5 hours at room temperature and then overnight at 0° C. The mixture was diluted with iced water and the solid which separated was collected and chromatographed on alumina (25 g.). Recrystallisation of the eluted material from ether-petroleum ether afforded betamethasone 17,20-dibutyrate, M.P. 125° C., $[\alpha]_D$ +64° (c. 1.0, dioxan), $$\lambda_{max.}^{EtOH}\ 238\ m\mu\ (\epsilon\ 15,900)$$

(Found: C, 67.3; H, 7.5. $C_{30}H_{41}FO_7$ requires C, 67.7; H, 7.8%.)

EXAMPLE 31

17α - butyryloxy - 9α-fluoro-11β-hydroxy-16β-methyl-21-valeryloxypregna-1,4-diene-3,20-dione (betamethasone 17-butyrate 21-valerate)

17α-butyryloxy-9α-fluoro-11β,21-dihydroxy-16β-methylpregna-1,4-diene-3,20-dione (700 mg.) in dry pyridine (10 ml.) was treated with valeryl chloride (0.23 ml.) at 0° C. for 40 minutes and worked up as described in Example 24. The product was crystallised from ether-petroleum ether to afford betamethasone 17-butyrate 21-valerate, M.P. 106–107° C., $[\alpha]_D$ +62° (c. 0.8, dioxan), $$\lambda_{max.}^{EtOH}\ 237–238\ m\mu\ (\epsilon\ 15,600)$$

(Found: C, 68.2; H, 7.9. $C_{31}H_{43}FO_7$ requires C, 68.1; H, 7.9%.)

EXAMPLE 32

*21 - acetoxy - 9α - fluoro-11β-hydroxy-17α-isobutyryloxy-16β-methylpregna-1,4-diene-3,20-dione (metamethasone 17-isobutyrate 21-acetate)*

9α - fluoro - 11β,21 - dihydroxy-17α-isobutyryloxy-16β-methylpregna-1,4-diene-3,20-dione (1 g.) in dry pyridine (12 ml.) containing acetyl chloride (0.3 ml.) was kept at 0° C. for 5 hours and then worked up as described in Example 24. Crystallisation from ether-petroleum ether at —80° C. gave betamethasone 17-isobutyrate 21-acetate (929 mg.), M.P. 131° C. (decomp.), [α]$_D$ +56.6° (c. 1.0, dioxan), $\lambda_{max.}^{EtOH}$ 238–239 m$\mu$ ( $\epsilon$ 14,900)

(Found: C, 66.5; H, 7.7. $C_{28}H_{37}FO_7$ requires C, 66.65; H, 7.4%.)

EXAMPLE 33

*9α - fluoro-11β-hydroxy-17α-isobutyryloxy-16β-methyl-21-propionyloxypregna - 1,4-diene-3,20-dione (betamethasone 17-isobutyrate 21-propionate)*

9α - fluoro - 11β,21 - dihydroxy-17α-isobutyryloxy-16β-methylpregna-1,4-diene-3,20-dione (1 g.) in dry pyridine (12 ml.) containing propionyl chloride (0.24 ml.) was kept at 0° C. for 1 hour. The solid which was precipitated by the addition of water was recrystallised from ether-petroleum ether at —80° C. to afford betamethasone 17-isobutyrate 21-propionate (663 mg.), M.P. 93° C. (decomp.), [α]$_D$ +61.5° (c. 1.0, dioxan), $\lambda_{max.}^{EtOH}$ 237–238 m$\mu$ ( $\epsilon$ 15,600)

(Found: C, 67.0; H, 7.3. $C_{29}H_{39}FO_7$ requires C, 67.1; H, 7.6%.)

EXAMPLE 34

*9α-fluoro-11β-hydroxy - 17α - isobutryloxy - 16β-methyl-21-valeryloxypregna - 1,4-diene-3,20-dione (betamethasone 17-isobutyrate 21-valerate)*

9α-fluoro-11β,21-dihydroxy-17α - isobutyryloxy - 16β-methylpregna-1,4-diene-3,20-dione (1 g.) in dry pyridine (12 ml.) containing valeryl chloride (0.34 ml.) was kept for 30 minutes at 0° C. and then diluted with water. The precipitated solid was crystallised from ether-petroleum ether at —80° C. to afford betamethasone 17-isobutyrate 21-valerate (935 mg.), M.P .98° C. (decomp.), [α]$_D$ +68.5° (c. 1.0 dioxan)

$\lambda_{max}^{EtOH}$ 238–239 m$\mu$ ( $\epsilon$ 15,600)

(Found: C, 68.1; H, 7.8. $C_{31}H_{43}FO_7$ requires C, 68.1; H, 7.9%.)

EXAMPLE 35

*21-acetoxy-9α-chloro-11β-hydroxy-16β-methyl-17α-propionyloxypregna-1,4-diene-3,20-dione*

9α-chloro-11β,21-dihydroxy - 16β - methyl - 17α-propionyloxypregna-1,4-diene-3,20-dione (400 mg.) in dry pyridine (1.6 ml.) containing acetic anhydride (1.6 ml.) was kept at room temperature for 50 minues and the solution was then diluted with water. Recrystallisation of the precipitated material from acetone-petroleum ether gave 21-acetoxy-9α-chloro-11β-hydroxy-16β-methyl-17α-propionyloxypregna-1,4 - diene - 3,20-dione (290 mg.), M.P. 217–219° C. after previous sintering, [α]$_D$ +94° (c. 0.96, CHCl$_3$), $\lambda_{max.}^{EtOH}$ 238–239 m$\mu$ ( $\epsilon$ 15,100)

(Found: C, 63.75; H, 7.1; Cl, 7.0. $C_{27}H_{35}ClO_7$ requires C, 63.95; H, 7.0; Cl, 7.0%.)

EXAMPLE 36

*9α-chloro-11β-hydroxy-16β-methyl-17α,21-dipropionyloxypregna-1,4-diene-3,20-dione*

9α-chloro-11β,21-dihydroxy-16β - methyl - 17α - propionyloxypregna-1,4-diene-3,20-dione (1.4 g.) in dry pyridine (17 ml.) containing propinoyl chloride (0.5 ml.) was kept at 0° C. for 1 hour and then at room temperature for 30 minutes. Dilution with water afforded a solid which, on crystallisation from acetone-ether at —80° C., gave 9α-chloro-11β-hydroxy-16β - methyl-17α,21-dipropinoyloxypregna-1,4-diene-3,20-dione (1.2 g.), M.P. 117–120° C. (decomp.), [α]$_D$ +98.0° (c. 1.0, dioxan)

$\lambda_{max.}^{EtOH}$ 238 m$\mu$ ( $\epsilon$ 15,990)

(Found: C, 64.8; H, 7.0; Cl, 6.75. $C_{28}H_{37}ClO_7$ requires C, 64.55; H, 7.15; Cl, 6.8%.)

EXAMPLE 37

*17α,21-diacetoxy-9α-fluoro-11β - hydroxy - 16β-methylpregna-1,4-diene-3,20-dione (betamethasone 17,21-diacetate)*

Betamethasone 21-acetate (780 mg.) was suspended in benzene (200 ml.) and acetic anhydride (24 ml.) containing perchloric acid (60%; 0.024 ml.) was added. The solution was stirred at room temperature for 55 minutes, the reaction being followed by thin-layer chromatography. The solution was washed with sodium bicarbonate solution and water, dried (MgSO$_4$) and evaporated to dryness. The residual froth was dissolved in benzene and chromatographed on netural alumina (Grade III). Elution with benzene and benzene/ether gave, first, betamethasone 11,17,21-triacetate, and then a fraction which was shown by thin-layer chromatography to be a mixture of betamethasone 11,21-diacetate and betamethasone 17,21-diacetate.

The following examples illustrate topical formulations prepared in accordance with the invention. In each example the active ingredient may for example be betamethasone 17,21-dipropionate, or betamethasone 17-valerate but it will be appreciated that this substance may be replaced by other active compounds used in accordance with the invention.

The following Examples A–D illustrate the preparation of ointments.

EXAMPLE A

|   | Percent w./w. |
|---|---|
| Active ingredient | 0.1 |
| Liquid paraffin B.P. | 10.0 |
| White soft paraffin to produce 100 parts by weight. | |

Ball-mill the steroid with a little of the liquid paraffin until the particle size is reduced to 95% by number below 2$\mu$. Dilute the paste and rinse out the mill with the remaining liquid paraffin, mix and add the suspension to the melted white soft paraffin at 50° C. Stir until cold to give a homogeneous ointment.

EXAMPLE B

|   | Percent w./w. |
|---|---|
| Active ingredient | 0.25 |
| Aluminium stearate | 3.2 |
| Liquid paraffin B.P., to 100 parts w./w. | |

Disperse the aluminium stearate in the liquid paraffin by vortex stirring and heat the suspension with continued stirring, at a temperature rise rate of 2° C. per minute until 90° C. is reached. Maintain the temperature at 90–95° C. for 30 minutes until solution is complete and a gel is formed. Cool quickly, preferably by the use of cooling coils or concentric cooling rings to produce a transparent solid gel. Mill the active ingredient to produce microfine particles of which not less than 90% by number are below 5$\mu$. Triturate with a small portion of the gel and incorporate the remaining gel to give a homogeneous mix.

EXAMPLE C

|   | Percent w./w. |
|---|---|
| Active ingredient | 0.1 |
| Woolfat | 12.0 |
| Cetostearyl alcohol B.P.C. | 20.0 |
| Liquid paraffin B.P. | 25.0 |
| White soft paraffin to 100 parts w./w. | |

Ball-mill the steroid with a little of the liquid paraffin as in Example A and add the resulting paste, diluted with the remaining liquid paraffin, to a mixture of cetostearyl alcohol, woolfat and white soft paraffin, melted together by gentle warming. Stir until cold to give a homogeneous mix.

EXAMPLE D

|  | Percent w./w. |
|---|---|
| Active ingredient | 0.05 |
| Hydrogenated lanolin e.g. Lanocerina sold by Croda Ltd. of London, England | 20.0 |
| Liquid paraffin B.P. | 15.0 |
| White soft paraffin to 100 parts w./w. | |

Ball-mill the steroid with liquid paraffin as in Example A, and add the resulting paste, diluted with the remaining liquid paraffin, to the mixture of hydrogenated lanolin and white soft paraffin, melted together by gently warming. Stir until cold to give a homogeneous mix.

The following Examples E and F illustrate the preparation of water-miscible creams:

EXAMPLE E

|  | Percent w./w. |
|---|---|
| Active ingredient | 0.1 |
| Beeswax | 15.0 |
| Cetostearyl alcohol B.P.C. | 7.0 |
| Cetomacrogol 1000 B.P.C. | 3.0 |
| Liquid paraffin B.P. | 5.0 |
| Chlorocresol | 0.1 |
| Distilled water to produce 100 parts by weight. | |

Ball-mill the steroid with a little liquid paraffin as described in Example A. Heat the available water to 100° C., add the chlorocresol, stir to dissolve and cool to 65° C. Melt together the beeswax, cetostearyl alcohol and cetomacrogol and maintain at 65° C. Add the steroid suspension using the remaining liquid paraffin for rinsing. Add the steroid oily phase at 60° C. to the chlorocresol aqueous phase at 65° C. and stir rapidly while the emulsion cools over the gelling point (40–45° C.). Continue to stir at slow speed until the cream sets.

EXAMPLE F

|  | Percent w./w. |
|---|---|
| Active ingredient | 0.1 |
| Cetostearyl alcohol B.P.C. | 7.2 |
| Cetomacrogol 1000 B.P.C. | 1.8 |
| Liquid paraffin B.P. | 6.0 |
| White soft paraffin | 15.0 |
| Chlorocresol | 0.1 |
| Distilled water to produce 100 parts by weight. | |

Prepared as described in Example E, replacing the beeswax with white soft paraffin in the oily phase.

The following Examples G and H illustrate the preparation of lotions:

EXAMPLE G

|  |  |  |
|---|---|---|
| Active ingredient | percent w./v. | 0.25 |
| Lanbritol wax[1] | percent w./v. | 0.93 |
| Diethylene glycol monostearate | percent w./v. | 0.65 |
| Cetostearyl alcohol B.P.C. | percent w./v. | 0.65 |
| Liquid paraffin B.P. | percent w./v. | 1.95 |
| Glycerin | percent w./v. | 5.0 |
| Isopropyl alcohol | percent v./v. | 6.5 |
| Methyl p-hydroxy benzoate | percent w./v. | 0.15 |
| Distilled water to produce 100 volumes. | | |

Ball-mill the steroid with half the glycerin, as in Example A and use the isopropyl alcohol for dilution and rinsing purposes.

Melt together the Lanbritol wax, diethylene glycol monostearate, cetostearyl alcohol and liquid paraffin and maintain 60° C. Heat the available water and remaining

[1] Lanbritol wax is a non-ionic wax for stabilizing emulsions consisting of a mixture of fatty alcohols with polyethylene glycol ethers of fatty alcohols sold by Ronsheim Moore of London, W.C. 1, England.

glycerin to 95° C. Add the methyl parahydroxy benzoate and stir until dissolved. Cool to 65° C. Add the oily mix at 60° C. to the aqueous phase at 65° C. and allow to cool while stirring rapidly until the emulsion gels at 40–45° C., thereafter stir slowly. Add the well mixed steroid suspension slowly to the lotion base and stir to obtain a homogeneous mix.

EXAMPLE H

|  | Percent w./v. |
|---|---|
| Active ingredient | 0.05 |
| Tween 80 (polyoxyethylene sorbitan mono-oleate sold by Atlas Powder Co.) | 0.01 |
| Carbopol 934 (carboxy vinyl polymers sold by B. F. Goodrich Chemical Co., Cleveland, Ohio) | 0.3 |
| Diethanolamine | 0.5 (approx.) |
| Distilled water to produce 100 vols. | |

Ball-mill the steroid with a little water and the Tween 80 as in Example A. Disperse the Carbopol 934 in the available water by vortex stirring. Add the diethanolamine, slowly with stirring until the clear thickened mix has a pH of 7.0. Incorporate the steroid slurry into the lotion base and mix well.

EXAMPLE I

Aerosol Spray Lotion

|  |  |  |
|---|---|---|
| Active ingredient | mgm | 2.5 |
| Fractionated coconut oil | g to | 1.20 |
| Dichlorodifluoromethane | g | 16.32 |
| Trichlorofluoromethane | g | 24.48 |

Dry the active ingredient overnight at 60° C. under vacuum and over phosphorus pentoxide. Ball-mill the dried powder for at least 4 hours with a little of the dried filtered oil. Rinse out the mill with more dried filtered oil and pass the suspension through a 325 mesh B.S. sieve. Assay the suspension and dilute with more dried filtered oil to the required concentration. Incorporate the suspension into the pressure container with the propellants in a conventional manner.

EXAMPLE J

Aphthous Ulcer Pellets

|  |  |  |
|---|---|---|
| Active ingredient | mgm | 0.25 |
| Lactose | mg | 69.90 |
| Acacia | mg | 3.00 |
| Magnesium stearate | mg | 0.75 |

Pass the steroid, lactose and acacia, separately through a No. 60 B.S. mesh sieve. Blend the powders and granulate with 50% ethanol in water. Pass the mass through a No. 12 mesh B.S. sieve and dry the granules at 50° C. Pass the dried granules through a No. 20 mesh B.S. sieve and blend in the magnesium stearate, previously passed through a No. 100 mesh B.S. sieve. Compress in a conventional manner on 7/32 inch diameter punches, to give a pellet that will dissolve slowly in the mouth.

EXAMPLE K

Retention Enema

|  |  |  |
|---|---|---|
| Active ingredient | percent w./v. | 0.0005 |
| Tween 80 | percent w./v. | 0.05 |
| Ethanol | percent v./v. | 0.015 |
| Methyl p-hydroxy benzoate | percent w./v. | 0.08 |
| Propyl p-hydroxy benzoate | percent w./v. | 0.02 |
| Distilled water | volumes to | 100 |

Heat the available water to 95° C., add the methyl and propyl p-hydroxy benzoates and stir to dissolve. Cool the vehicle to room temperature. Disperse the steroid in the ethanol and add to the Tween 80; warm the mixture to 50° C. and stir until the steroid is in solution. Add the steroid solution to the vehicle, stirring vigorously to avoid precipitation, and make up to volume with water if required. Distribute the enema into suitable plastic bags e.g. PVC bags for self-administration or into other containers suitable for use.

EXAMPLE L

Eye Drops

| | | |
|---|---|---|
| Active ingredient | percent w./v | 0.025 |
| Tween 80 | percent w./v | 2.5 |
| Ethanol | percent v./v | 0.75 |
| Benzalkonium chloride | percent w./v | 0.02 |
| Phenyl ethanol | percent v./v | 0.25 |
| Sodium chloride | percent w./v | 0.60 |
| Water for injection | volumes to | 100 |

Dissolve the sodium chloride, benzalkonium chloride and phenyl ethanol in the water for injection. Suspend the steroid in the alcohol and add to the Tween 80. Warm the mixture to 50° C. and stir until dissolved. Add the steroid solution to the eye-drop vehicle with rapid stirring to obtain a clear solution. Sterilise the bulk by filtration through a 5/3 sintered glass filter and distribute into sterile small well filled, neutral glass eye-drop containers.

EXAMPLE M

Nasal Drops

| | | |
|---|---|---|
| Active ingredient | percent w./v | 0.005 |
| Tween 80 | percent w./v | 0.05 |
| Alcohol 95% | percent w./v | 0.15 |
| Methyl p-hydroxy benzoate | percent v./v | 0.04 |
| Propyl p-hydroxy benzoate | percent v./v | 0.02 |
| Sodium chloride | percent v./v | 0.70 |
| Distilled water | volumes to | 100 |

Dissolve the sodium chloride and the methyl and propyl p-hydroxy benzoates in the distilled water, heated to 95° C. and allow the solution to cool. Disperse the steroid in the alcohol and add to the Tween 80. Warm the mixture to 50° C. and stir until solution of the steroid is effected. Add the steroid solution to the vehicle with rapid stirring to obtain a clear solution. Filter the solution free from particulate matter through a sintered glass filter and distribute into small, well filled containers.

We claim:
1. A steroid compound of the formula

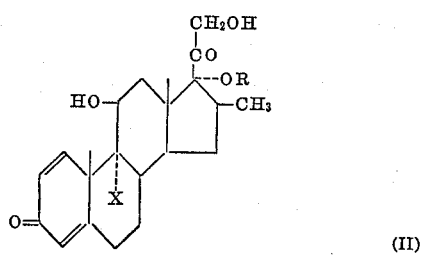

(II)

wherein X is chlorine or fluorine and R is a member of the group consisting of propionyl, butryl, isobutryl, valeryl, isovaleryl and cyclopentanecarbonyl.

2. Betamethasone 17-propionate.
3. Betamethasone 17-butyrate.
4. Betamethasone 17-isobutyrate.
5. Betamethsone 17-valerate.
6. Betamethasone 17-isovalerate.
7. Betamethasone 17-cyclopentanecarboxylate.
8. 17α - propionyloxy - 9α - chloro - 11β,21 - dihydroxy-16β-methylpregna-1,4-diene-3,20-dione.

9. A pharmaceutical composition for use in the topical treatment of inflammation comprising a steroid compound as claimed in claim 1 in association with a topical vehicle for said steroid.
10. A composition as claimed in claim 9 in which said steroid is betamethasone 17-valerate.
11. A compound of the formula

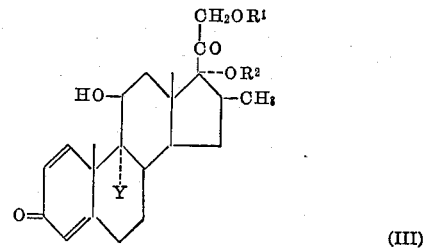

(III)

in which Y is chlorine or fluorine, R² is acetyl, propionyl, butyryl or isobutyryl and R¹ is an alkanoyl group containing 1 to 7 carbon atoms, the total number of carbon atoms in the groups R¹ and R² together being from 3 to 9.

12. Betamethasone 17,21-diacetate.
13. Betamethasone 17-propionate 21-acetate.
14. Betamethasone 17-propionate 21-isobutyrate.
15. Betamethasone 17,21-dipropionate.
16. Betamethasone 17-butyrate 21-acetate.
17. Betamethasone 17-butyrate 21-propionate.
18. Betamethasone 17-butyrate 21-valerate.
19. Betamethasone 17-isobutyrate 21-acetate.
20. Betamethasone 17-isobutyrate 21-propionate.
21. 17α,21 - dipropionyloxy - 9α - chloro - 11β - hydroxy-16β-methylpregna-1,4-diene-3,20-dione.
22. 17α - propionyloxy - 21 - acetoxy - 9α - chloro - 11β - hydroxy - 16β - methylpregna - 1,4 - diene - 3,20 - dione.
23. A pharmaceutical composition for use in the topical treatment of inflammation comprising a steroid compound as claimed in claim 11 in association with a topical vehicles for said steroid.
24. A method for the topical treatment of a topical inflammatory condition which comprises applying to the inflamed area a steroid compound of claim 1.
25. A method for the topical treatment of a topical inflammatory condition which comprises applying to the inflamed area a steroid compound of claim 11.
26. A compound of claim 11 wherein Y is fluorine.
27. A compound of claim 11 wherein R¹ contains less than 4 carbon atoms and R² contains 3 to 4 carbon atoms.
28. A compound of claim 27 wherein Y is fluorine.

References Cited by the Examiner

UNITED STATES PATENTS 3,147,249  9/1964  Ercoli et al. _____ 260—239.55
3,152,154  10/1964  Ercoli et al. _____ 260—397.45

OTHER REFERENCES

Gardi et al., Tetrahedron Letters, No. 13 (1961); pp. 448–451.

LEWIS GOTTS, *Primary Examiner.*

ELBERT L. ROBERTS, *Examiner.*

THOMAS MESHBESHER, *Assistant Examiner.*